W. L. SUMMERSON.
MEANS FOR FACILITATING THE TRANSACTION OF MAIL ORDER BUSINESS.
APPLICATION FILED MAR. 16, 1917.

1,256,183.

Patented Feb. 12, 1918.

Fig. 1.

John Doe & Company
Chicago, Ill.

This order is from Department No. 2

Departments Ordered from:

| 2 | 3 | 1 | 8 | | | | | |
|---|---|---|---|---|---|---|---|---|

Ship to: ..........................
Street & No. ..........................
City ..........................
State ..........................

| Number of Article in Catalog | Quantity | Description of Article | Size Color | Price |
|---|---|---|---|---|
| X923 | ½ doz. | Black Silk Hose | 6½ | $4.00 |

Inventor
William L. Summerson
By his Attorney

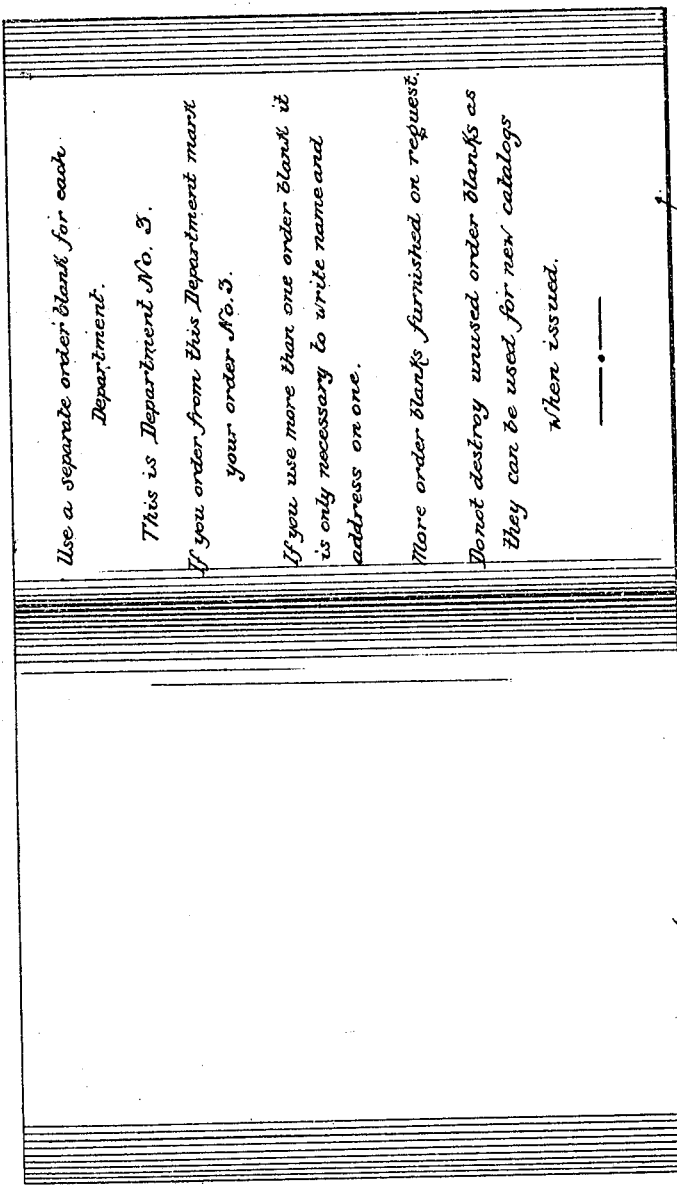

UNITED STATES PATENT OFFICE.

WILLIAM L. SUMMERSON, OF NEW YORK, N. Y.

MEANS FOR FACILITATING THE TRANSACTION OF MAIL-ORDER BUSINESS.

1,256,183.  Specification of Letters Patent.  Patented Feb. 12, 1918.

Application filed March 16, 1917. Serial No. 155,160.

*To all whom it may concern:*

Be it known that I, WILLIAM L. SUMMERSON, a citizen of the United States, and a resident of the city, county, and State of New York, have invented a certain new and useful Improvement in a Means for Facilitating the Transaction of Mail-Order Business, of which the following is a specification.

This invention relates to a manner of preparing order blanks and catalogues to be sent to prospective purchasers whereby a saving of time is effected by the purchaser in selecting the desired articles from the catalogues and celerity in the delivery of the articles selected is also accomplished by the manner in which my improved order blank is composed.

It is well known that the catalogues in general use to-day are sent out to prospective customers, each of said catalogues containing one or more order blanks. In using the order blanks, the customer peruses the catalogue and selects therefrom the desired articles and lists the same on one order blank. When the store receives the order blank it is turned over to their order clerk who fills out different orders for the articles contained on the customer's order sold in the various departments of the store and forwards these orders to their respective departments to be filled and shipped to the customer.

By the use of my improved order blank and manner of preparing the catalogue this laborious method of transacting business is avoided. The labors of the order clerk are minimized and instead of rewriting the various orders sent in by the customers he merely forwards these orders to the different departments to which they are directed.

These and other objects are accomplished by my invention. a more particular description of which will be hereinafter set forth.

Referring to the accompanying drawings forming part hereof,

Figure 1 is a face view of my improved order blank and

Fig. 2 is a face view of a catalogue showing an insert embodied in the same for the instruction of the customer.

In the accompanying drawings I have shown the preferred embodiment of my invention wherein 1 indicates the improved order sheet. This order sheet is provided with the suitable heading 2, and place for the name and address of the customer to be inserted as at 3. The name or number of the department handling the goods to be listed on the order blank is indicated as at 4, this name or number being filled in by the customer, or if the customer omits to fill in the name or number it is filled in when received at the store. The portion 5 of the blank is utilized to describe and enumerate the articles to be purchased.

The catalogue 8 of the concern, to be used in conjunction with my improved blank is "departmentized", that is, it is made up so that the various articles comprised in one department are contained in one portion of the book, whereby the catalogue is divided up into various departments, so that a customer desiring shoes can look in the shoe department and for neckties, can look in the neckwear department etc. If desired, the various departments may be suitably numbered and an index to the numbers may be inserted at a suitable place in the book. Or if undesirable, to "departmentize" the catalogue as hereinbefore mentioned, the department number of each article may be printed in close proximity to the illustration or reference to the article. Instruction sheets 7 as shown in Fig. 2 are inserted in the catalogue preferably at points preceding the department to which they relate.

The order blanks relating to each department are preferably sent with the catalogue to the customer.

In ordering the articles comprised in the catalogue the customer locates the various articles desired in one department and fills out a blank relating to that department, then fills out another blank for something desired in another department and mails the various orders to the store. When the blanks are received by the store they are then immediately forwarded to their respective departments to be filled whereby the waste of time by the order clerk in recopying on separate blanks the various articles listed on one blank by the purchaser is avoided.

At 6 in Fig. 1, I have indicated spaces where department numbers are to be inserted. When it occurs that a customer has ordered a variety of articles from various departments in the store. he will, as before mentioned fill out separate order blanks for the goods comprised in each department, these different blanks being forwarded to their respective departments to be filled. When the articles enumerated in each order are selected they are forwarded to the shipping department for shipment to the customer. In order that the shipping department will know when the entire order has been filled, that is, when that department receives all the articles ordered by the customer from the various departments the customer fills in the spaces at 6 reference to the various departments from which he has ordered articles, so that the shipping clerk will wait until he receives the articles from the various departments enumerated at 6 before he ships to the customer the order. To make this clear, reference is to be had to Fig. 1, wherein silk hose is ordered in department 2. In the spaces at 6, appear the department numbers 3, 1 and 8 which indicate other articles ordered in departments 3, 1 and 8. When department 2 fills the order for the silk hose, the hose is forwarded to the shipping department with the order blank shown in Fig. 1 and the shipping clerk when looking at this order blank will note that he must obtain articles from departments 3, 1 and 8 before the complete order is obtained so that he cannot inadvertently forward to the customer a portion of his order at a time.

If the customer neglects to fill in the various department numbers in the spaces at 6 these numbers are filled in by the store when the orders are received and before such orders are distributed to the various departments to which they are directed.

From the foregoing it is obvious that my invention is not to be restricted to the exact embodiment herein shown, but is broad enough to cover all structures coming within the scope of the annexed claims.

What I claim is:—

1. An order blank, said blank being proportioned to provide spaces appropriately designated to receive indicia pertaining to articles ordered on the blank and also ordered on additional blanks by a customer, said blank also having delineated a space or spaces to receive a list of the names of articles comprised in a single department in the store.

2. An order blank, said blank being ruled to provide columns or spaces appropriately designated to receive indicia relating to articles ordered from a single department in a store and additional delineated spaces appropriately designated to receive indicia indicating the departments from which the articles enumerated on the blank are ordered and also to indicate the departments from which goods enumerated on separate order blanks are ordered.

Signed at the city, county and State of New York, this 14th day of March, 1917.

WILLIAM L. SUMMERSON.

Copies of this patent may be obtained for five cents each, by addressing the "Commissioner of Patents, Washington, D. C."